United States Patent [19]

Field

[11] Patent Number: 4,765,901
[45] Date of Patent: Aug. 23, 1988

[54] METHOD FOR PURIFYING WASTE WATER

[75] Inventor: James A. Field, Balk, Netherlands

[73] Assignee: Pacques B.V., Balk, Netherlands

[21] Appl. No.: 26,255

[22] Filed: Mar. 16, 1987

[30] Foreign Application Priority Data

Mar. 20, 1986 [NL] Netherlands .......................... 8600723

[51] Int. Cl.$^4$ .............................................. C02F 3/28
[52] U.S. Cl. ..................................... 210/603; 210/606;
210/631; 210/632; 210/909; 210/928; 435/156;
435/189; 435/262; 435/801
[58] Field of Search .............. 210/603, 606, 631, 632,
210/909, 928, 611; 435/156, 189, 262, 801

[56] References Cited

U.S. PATENT DOCUMENTS

| 3,977,966 | 8/1976 | Pradt | 210/631 |
|---|---|---|---|
| 4,022,665 | 5/1977 | G'hosl | 210/603 |
| 4,169,049 | 9/1979 | Salkinoja | 210/909 |
| 4,213,857 | 7/1980 | Ishida | 210/603 |
| 4,340,490 | 7/1982 | Junkermann | 210/909 |
| 4,344,848 | 8/1982 | Hakulinen | 210/909 |
| 4,485,016 | 11/1984 | Hopkins | 210/632 |
| 4,592,843 | 6/1986 | Guilbault | 210/909 |
| 4,623,465 | 11/1986 | Klibanov | 210/632 |
| 4,663,043 | 5/1987 | Molin | 210/606 |
| 4,666,605 | 5/1987 | Minami | 210/928 |

FOREIGN PATENT DOCUMENTS

| 134766 | 3/1985 | European Pat. Off. | 210/603 |
|---|---|---|---|
| 54-136747 | 10/1979 | Japan | 210/603 |
| 55-88896 | 7/1980 | Japan | 210/603 |
| 58-74191 | 5/1983 | Japan | 210/632 |
| WO85/02690 | 6/1985 | PCT Int'l Appl. | 210/603 |
| 2010798 | 7/1979 | United Kingdom | 210/603 |
| 914507 | 3/1982 | U.S.S.R. | 210/632 |
| 939407 | 6/1982 | U.S.S.R. | 210/606 |

OTHER PUBLICATIONS

Refaat, "Biologically Active Filter Combined with Enzyme Treatment, Water-1976 II Biological Wastewater Treatment A.I.Ch. E. Symposium Seires, pp. 166-171.
Hackl's Chemical Dictionary, McGraw-Hill Book Co, New York, 1972, 376.
Klibanov, Enzymatic Removal of Havardous Organics from Industrial Aqueous Effluents, Biotechnology in the Marine Sciences, John Wiley & Sons 1984, 259-273.
Atlow, "Dephenolization of Industrial Wastewaters Catalyzed by Polyphenol Oxidase, Biotechnology & Bioengineering, vol. XXVI, pp. 599-603 (1984).
Chemical Abstracts 95:85697s (1981).
Haslam, "Polyphenol-Protein Interactions," *Biochem. J.* 139:285-288, 1974.
Williams, "The Simpler Phenolic Substances of Plants" *J. Science Food Agric.*, 8, 377-385 (1957).

*Primary Examiner*—Ernest G. Therkorn
*Attorney, Agent, or Firm*—Dennison, Meserole, Pollack & Scheiner

[57] ABSTRACT

A process for treating waste water containing both phenolic compounds being toxic for methanogenic organisms and degradable non-phenolic compounds prior to its anaerobic purification as well as a process for detoxifying waste water containing phenolic compounds being toxic for aquatic organisms by subjecting said waste water to an oxidative treatment in such a way that no or virtually no precipitation is formed of the polyphenol compounds produced and virtually no influence is executed on the biochemical oxygen demand and the chemical oxygen demand of the waste water.

15 Claims, 3 Drawing Sheets

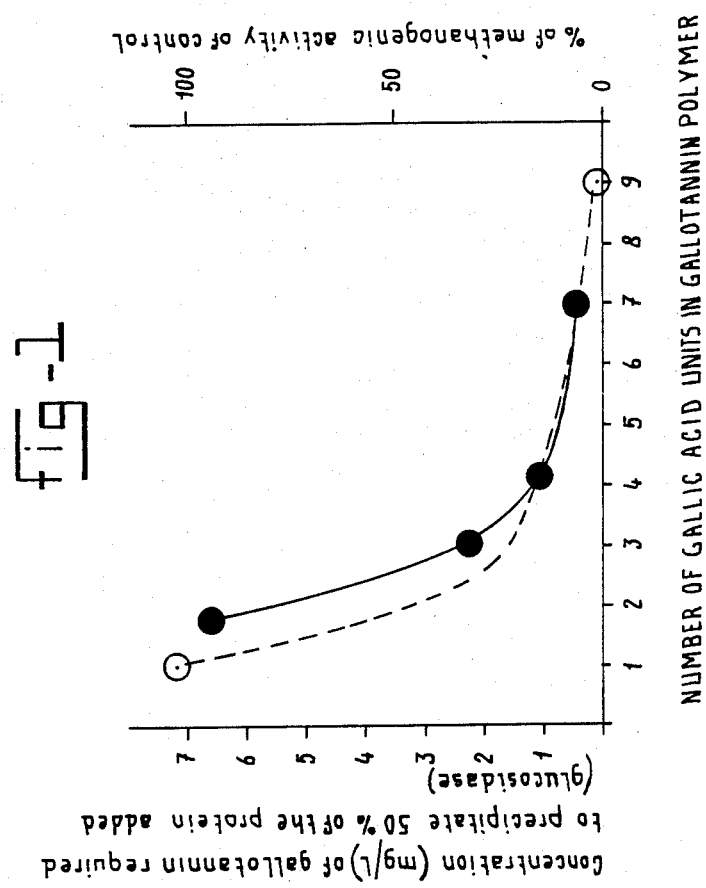

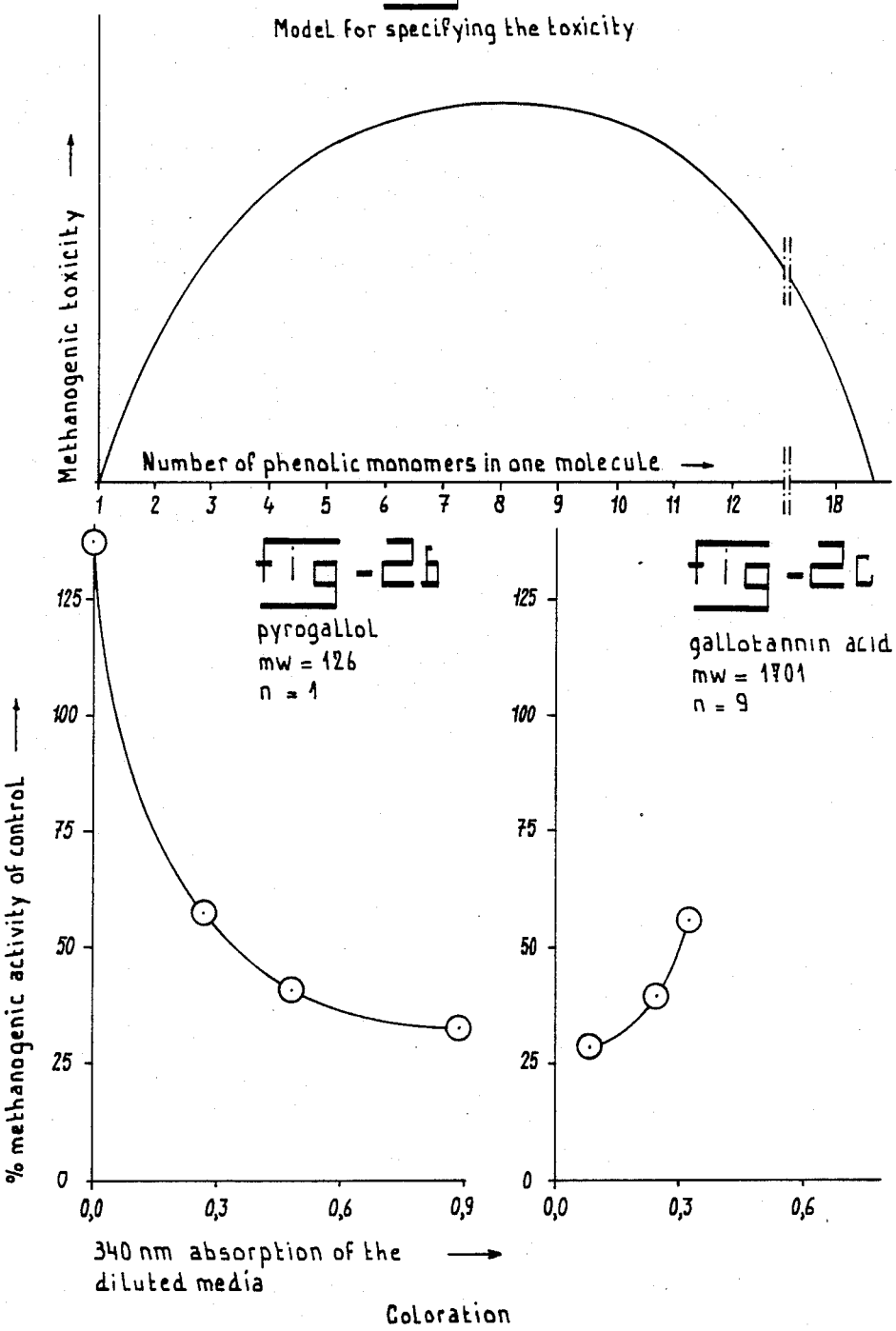

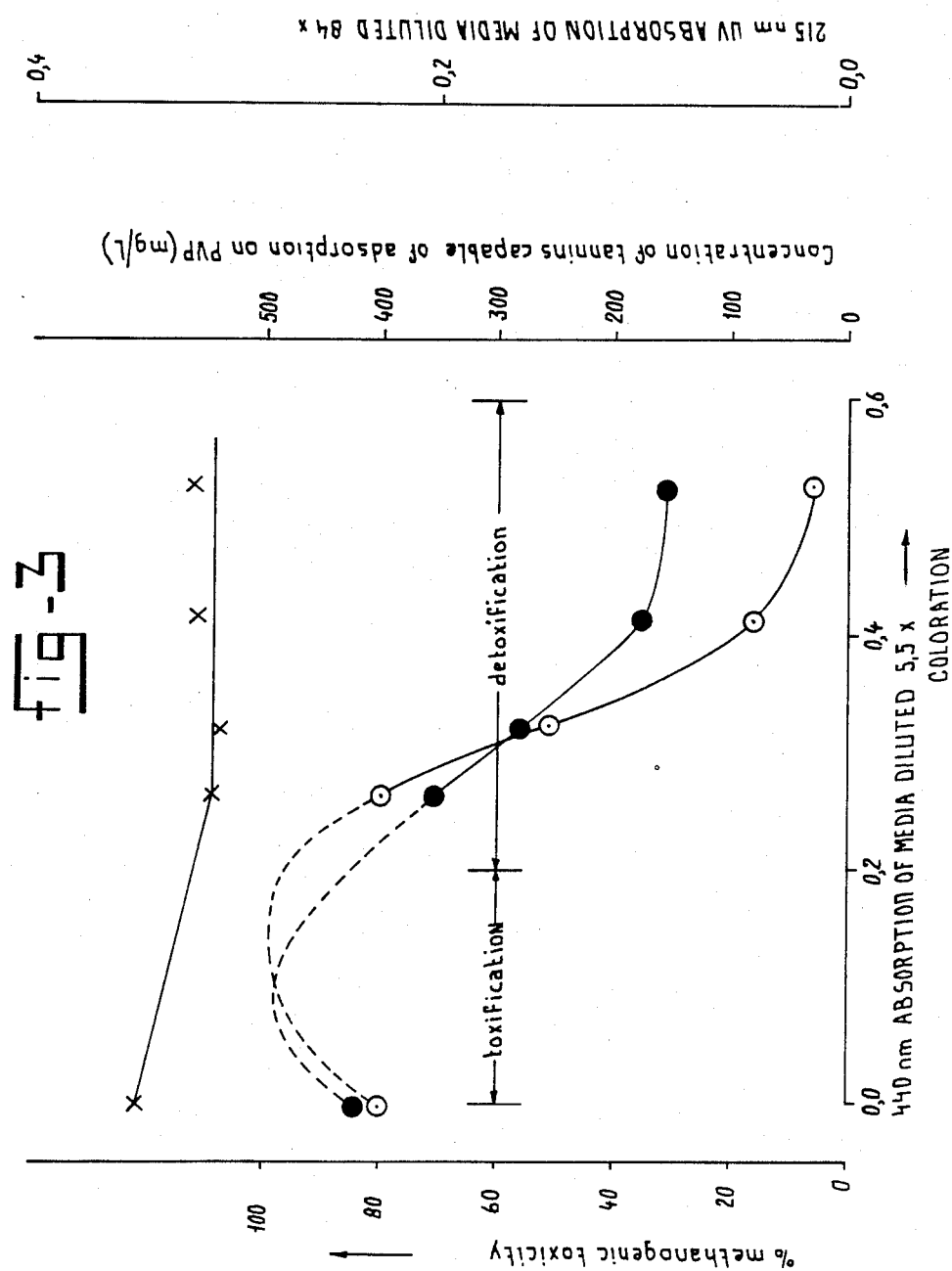

METHOD FOR PURIFYING WASTE WATER

The invention relates to the purification of waste water, in particular waste water from the paper, paper board and wood industries.

In "Dephenolization of Industrial Wastewaters Catalyzed by Polyphenol Oxidase", Biotechnology and Bioengineering, Vol. XXVI, pages 599–603 (1984) a method is proposed which comprises an enzymatic treatment of waste water with the enzyme phenyloxydase. The purification of industrial waste water such as from the petrochemical industry and, inter alia, from the wood, paper board and paper industries, is named as a possible application of this method. By means of said method phenol derivatives are removed by oxidizing the phenol derivatives present to o-quinones which subsequently undergo a non-enzymatic polymerization to water-insoluble aggregates. Said aggregates can be extracted in an optional manner, for example by filtration, settling or centrifugation. The innovation of the method described above relates to the use of the oxygen-phenyloxydase enzyme system instead of an already previously known system which uses hydrogen peroxide as oxidizing agent and the peroxydase enzyme. Both methods have as a common object the removal of dissolved phenol derivatives from waste water by conversion thereof into an extractable insoluble form. In both the methods mentioned above an oxidation is therefore carried out which entails an extensive polymerization as a result of which oxidized phenol derivatives become large enough to be insoluble. Such a method will be described as "oxidative dephenolization" below.

However, as is known, an anaerobic purification of waste water (which contains more than 1 g/l of degradable COD) is preferable to an aerobic purification. This is because an anaerobic purification produces a useful product, namely methane gas, from the waste water. In addition, the energy costs are lower for anaerobic purification than for aerobic purification, and at the same time relatively less sludge is produced than in the case of aerobic purification. However, anaerobic purification of waste water from, for example, certain waste flows from the paper, paper board and wood industries has been found to yield poor results in relation to the expected methanogenic activity.

An investigation by the Applicant has resulted in the observation that phenolic derivatives such as tannic acids (tannins) have a toxic effect on the methanogenic bacteria, for example of the genera Methanosarcina and Methanothrix, used anaerobically.

From the investigation carried out by the Applicant it has moreover emerged that the toxicity of the tannic acids and their monomeric derivatives is caused by the formation of hydrogen bonds between, on the one hand, bacterial proteins and, on the other hand, the phenol derivatives. The Applicant has presumed that this affinity disturbs the action of important proteins such as bacterial enzymes and consequently retards the methanogenic activity. A relationship has been established by the Applicant between the methanogenic toxicity and the affinity, known from the literature, of various tannic acids and their derivatives for proteins and similar polyamides (see FIG. 1). The increasing toxicity of phenol derivatives in proportion to a higher degree of polymerization may be ascribed to the increasing affinity of phenol derivatives for proteins, it being known from the literature (Haslam E. 1974, Polyphenol-protein interactions, Biochem. J. 139, pages 285–288) that an increased formation of hydrogen bonds by a molecule ensures a stronger bonding to proteins. The maximum toxicity with an increasing degree of polymerization is reached when the phenolderivatives have the size of tannic acids (molecular weight of approximately 500–3000), after which the toxicity decreases again if the degree of polymerization increases still further. This decrease in the toxicity is ascribed by the Applicant to the limited capacity of quite large polymers to penetrate into cells or membranes. The lower quality of the tannic acids with molecular weights of more than approximately 3000 intended for leather production is therefore ascribed to greater difficulty experienced by large molecules in gaining access to collagen (leather protein) fibres (White, T. 1957, Tannins-their occurrence and significance, J.,Sci. Food Agric. 8, pages 377–385).

FIG. 2A shows the relationship found by the Applicant between the degree of polymerization of the tannic acid derivatives on the one hand and the methanogenic toxicity on the other.

It has been found that waste water which also contains phenolic impurities can be purified anaerobically in an excellent manner if, prior to the anaerobic purification, the waste water is subjected to an oxidative treatment. Said oxidative treatment serves to increase the phenolic degree of polymerization, the formation of larger polymers from the smaller phenolic compounds originally present reducing or eliminating the methanogenic toxicity of the phenolic compounds originally present. Subsequently the residual fraction of the organic contamination can be purified further anaerobically without an undesirable retardation of the methane bacteria by the toxic phenolic compounds initially present. Said oxidative treatment will be described below as "oxidative detoxification".

In oxidative detoxification use is made of the knowledge gained by the Applicant that the methanogenic toxicity corresponds to the affinity of phenols for proteins and such polyamides, and that the methanogenic toxicity is dependent on the phenolic degree of polymerization as is the affinity of phenols for proteins. The degree of polymerization, and consequently the toxicity to methanogenic bacteria, can therefore be influenced by an oxidative pretreatment. For the required polymerization of the phenolic compounds use can be made of all the possible methods of oxidation such as, for example, aeration with phenyloxydase (which enzyme is also often described as tyrosinase, phenolase or polyphenolase), laccase and lignase, addition of peroxide with or without an inorganic catalyst or peroxidase, ozonization, and, as the simplest example, aeration in a basic environment (to promote autoxidation) by using hydroxide.

The abovenamed oxidative pretreatment also includes the use of such enzymes containing vegetable materials, bacteria and moulds.

The invention also relates to the aspect of the possibility of testing, it being possible, prior to the anaerobic purification of the waste water, to detect toxic components which have survived the oxidative pretreatment. In said testing use is made of the correlation between methanogenic toxicity and phenolic affinity for proteins and such polyamides as polyvinylpyrrolidone. The residual toxicity of the waste water subjected to the oxidative pretreatment can therefore be determined on the basis of the extent to which UV absorption (phenols absorbed UV light) or visible absorption (by means of special reagents such as vanillin-HCl or Folin-Colciteau reagent which exhibit coloration with the phenolic compounds present) disappears after a standardized contact time with a material based on polyamide or protein.

In relation to the "oxidative detoxification" described above according to the invention, it should be pointed out for the sake of completeness that the latter differs in two respects from the known "oxidative dephenolization". In the first place, the oxidative detoxification according to the invention is not the main purification process but a pretreatment with the object of converting the phenolic compounds into a harmless form. On the other hand, the oxidative dephenolization is the main purification process for waste water which contains mainly phenolic compounds as impurity. In the second place, in oxidative detoxification use is made of the insight acquired by the Applicant relating to the relationship between methanogenic toxicity, phenolic affinity for proteins and the degree of polymerization of phenolic compounds. This insight makes it possible to use the least possible oxidation which brings the polymerization to a controllable point at which the phenolic compounds just lose their toxic properties. The detoxification required according to the invention is reached in a much earlier stage of the polymerization than in oxidative dephenolization, in which the phenolic compounds are rendered insoluble by polymerization. As has already been stated above, dephenolization relates to a process in which the phenolic compounds are rendered insoluble by enzymatic oxidation so that the phenolic compounds can be extracted from the solution. Rendering the phenolic compounds insoluble in this manner is by no means necessary in oxidative detoxification since the phenolic compounds lose their toxic properties by polymerization (or by destructive oxidation) and not as a result of their being rendered insoluble and the polymers obtained subsequently being removed More particularly, in the method according to the invention the removal of the oxidized (polymerized) phenolic compounds from the solution is superfluous since the main contamination is the degradable COD which is removed biologically after the oxidative pretreatment by the anaerobic purification.

The soluble oxidized phenolic compounds which are formed in the oxidative pretreatment will sometimes be quite difficult to degrade. In this case, the oxidized phenols can be discharged in dissolved form; in this connection, the applicable requirement is that the discharge is below the discharge requirements set in relation to the biologically non-degradable COD. This last-named aspect has the advantage that the oxidized phenolic compounds no longer need to be extracted by, for example, filtration or settling. A second advantage is that in many cases the tannic acids initially present which occur in waste water from the wood, paper board and paper industries are difficult to degrade biologically per se before they are oxidized. On the basis of this it may be assumed that the oxidation of such tannic acids makes no further contribution to the biologically non-degradable COD and the tannic acid components in an oxidized form have a considerably reduced toxicity for fish (and other organisms living in water).

In other cases, the soluble oxidized phenolic compounds are easy to degrade anaerobically, for example tannic acids from the leather industry, which although very toxic, are nevertheless easily degradable in their original form and still remain largely degradable after an oxidative detoxification.

In the special case that the degree of substitution of the phenolic groups of the phenolic compounds is such that the phenolic compounds cannot be rendered harmless by means of the oxidative pretreatment according to the invention, said oxidative pretreatment is performed only after performing an anaerobic pretreatment of the waste water. Such an anaerobic preliminary stage, which precedes the oxidative polymerization, is used to remove the substituents of the phenol groups so that free reactive phenol groups are obtained. These freed phenol groups will then bring about the polymer formation discussed above in the subsequent oxidative pretreatment according to the invention. Examples of such substituents are, for example, methyl groups on phenol groups of lignin derivatives, acetyl groups and glucosides on phenol groups of some tannic acid derivatives. The abovementioned anaerobic preliminary stage is also effective in relation to chloro, sulpho and nitro substituents on benzene rings since these groups can be replaced by hydroxyl groups during the anaerobic preliminary stage.

BRIEF DESCRIPTION OF THE DRAWINGS

FIG. 1 shows the relationship between protein affinity and methanogenic activity.

FIG. 2A shows a model for reproducing the methanogenic toxicity of phenolic compounds as a function of the polymer size.

FIG. 2B shows methanogenic activity as a function of autoxidation coloration.

FIG. 2c shows methanogenic activity as a function of autoxidation coloration.

FIG. 3 shows detoxification of pine wood bark removal waste water by autoxidation.

DESCRIPTION OF THE PREFERRED EMBODIMENTS.

The method according to the invention is explained by reference to the figures discussed below.

FIG. 2a shows the curve plotted by the Applicant which shows the methanogenic toxicity as a function of the degree of polymerization of phenolic compounds. FIGS. 2b and 2c illustrate the manner in which the polymerization of pure phenolic standard compounds can be influenced by the oxidative pretreatment according to the invention. The course of the polymerization is shown on the basis of the development of colour which is measured as the extinction at a wavelength of 340 nm. From FIG. 2a, which shows the oxidation of pyrogallol (1,2,3-tri-hydroxybenzene) at pH 7.4, it is evident that the toxicity increases as a function of the degree of polymerization, which agrees with the model shown in FIG. 2a, The formation of small polymers from the monomer (pyrogallol) initially present is responsible for an increased toxicity since the polymeric form exhibits a tannic acid behaviour because of the increased possibility of hydrogen bond formation.

From the example shown in FIG. 2c, in which gallotanic acid (a polymer made up of nine units comparable with pyrogallol and one sugar) was oxidized at pH 7.4, it is evident that the toxicity decreases as a function of the degree of polymerization, which agrees with the model of the example in FIG. 2a. The formation of larger polymers from a polymer initially present brings about a decreasing toxicity because larger polymers have greater difficulty in penetrating the cells of the methanogenic bacteria. The ability of the polymers produced to exert their toxic action is poor since they come into contact with the bacterial protein to a lesser degree.

FIG. 3 shows the detoxification of waste water originating from the wet removal of bark which originates from pine wood (Pinus sylvestris). The filtered waste water was diluted to 1.8 g of COD/l, to which acetate, propionate and butyrate have been added for the purpose of determining the activity. The increasing degree of polymerization of the preliminary oxidative stage according to the invention is made clear on the basis of the development of colour. The toxicity of the tannic acids present in the waste water (420 mg/1 in the untreated media) first increases to some extent but after a certain colour point has been reached, a further oxidation results in a large decrease in the methanogenic toxicity. This pattern agrees with the model shown in FIG. 2a since the phenolic fraction of this waste water is approximately 25% non-tannic-acid phenol and 75% tannic-acid phenol. The non-tannic-acid fraction consists mainly of monomers. Said monomers polymerize more rapidly than the tannic-acid polymers so that it is first primarily the monomeric fraction which undergoes the oxidative polymerization. The increase in toxicity in this initial phase of the polymerization (toxification) agrees with the example of pyrogallol shown in FIG. 2b. A further oxidation leads to a point at which most of the monomers have been converted to tannic acids. A still more extensive oxidation brings about a decrease in the toxicity both of the tannic acids formed and of the tannic acids already present in the waste water; see FIG. 2c.

From FIG. 3 it is evident that the toxicity of the tannic acids corresponds to the affinity of the tannic acids for a polyamide designated polyvinylpyrrolidone (PVP). It is therefore possible to test the oxidative detoxification with PVP (or similar substances). From FIG. 3 it is also evident that during the detoxification process UV absorption remains fairly constant. Said UV absorption reflects the relative concentration of the total quantity of phenols. The methanogenic toxicity, like the tannic acid concentration capable of absorption on the PVP, has decreased while, at the same time the total phenol concentration has not decreased. A detoxification has therefore been achieved by the conversion of the soluble toxic phenols into soluble nontoxic or less toxic phenols. The advantage of this is that neither the formation of extractable/separable undissolved phenols nor the extraction thereof need to be promoted in order to achieve the desired detoxification.

From Table A it is evident that other oxidation methods are even more effective than autoxidation in detoxifying Norway spruce (Picea abies) bark extracts and birch (Betula sp) bark extracts. Table A shows that a high degree of detoxification is achieved by means of hydrogen peroxide and biological oxidation methods.

The decrease in the fish toxicity (carp) as a result of autoxidation of Norway spruce bark extracts is evident from Table B. The unpretreated extract was very toxic and even produced 100% fish mortality at approximately 100 mg COD/$l^{-1}$ while the autoxidated extract produced no fish mortality at the highest tested concentration of 2,500 mg of COD/$l^{-1}$. These results show that the tannic acids which are difficult to break down anaerobically can be safely discharged in relation to aquatic organisms if they have been pretreated by oxidative detoxification.

Table A The effect of the oxidation method on the rate of methane formation. The methanogenic activity of sludge (1.4 g organic solids per liter) fed with 4 g of volatile fatty acid COD/l after 14 days exposure to the inidicated extracts and the oxidizing treatments of the extracts. The control sludge was exposed only to water.

| Treatment | COD Total mg/l | Tannin mg/l | Methanogenic activity % of control activity in extract diluted 2.5× |
|---|---|---|---|
| Spruce | | | |
| Untreated | 6601 | 3544 | 1.0 NR* |
| Autoxidized | 6372 | 2245 | 20.7 R |
| $H_2O_2$ | 5123 | 359 | 103.4 |
| Autoxidized + $H_2O_2$ | 5454 | 720 | 104.2 |
| Aer.biol.oxidation | 4712 | 950 | 62.2 |
| Tannins removed | 3057 | 0 | 102.7 |
| Birch | | | |
| Untreated | 3062 | 1620 | 0.7 NR |
| Autoxidized | 2808 | 1048 | 4.0 R |
| $H_2O_2$ | 2629 | 397 | 62.4 |
| Autoxidized + $H_2O_2$ | 2604 | 436 | 95.9 |
| Aer.Biol.oxidation | 2066 | 539 | 83.4 |
| Tannins removed | 1442 | 0 | 53.7 |

Untreated = extract prepared from 18 g air-dried bark per liter of water at 60° C.
Autoxidized = extract brought to pH 11.5 and aerated for 22 hours.
$H_2O_2$ = extract treated for 22 hours with 3 g/l $H_2O_2$ at pH 11.5 (spruce 6 g/l $H_2O_2$)

Autoxidized + $H_2O_2$ = autoxidized extract treated for 22 hours with 3 g/l $H_2O_2$ at pH 11.5 (spruce 6 g/l
Aer.biol.oxidation = extract aerated 3 weeks biologically, innoculated with rotten bark
Tannins removed = extract treated with 14.3 g/l PVP and filtered.
*NR = no recovery of activity in 14 days
R = recovery of sludge activity after time period considered for activity measurement Control Sludge activity=720 mg COD/g of organic sludge solids per day.

Table B The fish mortality of carp exposed to the indicated concentration of spruce (Picea abies) bark extracts for 1 and 4 days and extracts autoxidized (at pH 11.5) extracts for 16 hours.

| Assay | Extract concentration mg COD/l | Initial Fish count | Dead fish after 1 day % of initial count | Dead fish after 4 days % of initial count |
|---|---|---|---|---|
| Extract untreated | 94 | 8 | 100 | 100 |
| Extract untreated | 125 | 4 | 100 | 100 |
| Extract untreated | 125 | 7 | 100 | 100 |
| Extract autoxidized | 120 | 7 | 0 | 0 |
| Extract autoxidized | 250 | 7 | 0 | 0 |
| Extract autoxidized | 1000 | 8 | 0 | 0 |
| Extract autoxidized | 2500 | 4 | 0 | 0 |

A more detailed explanation of the figures mentioned in the description follows below.

FIG. 1: Relationship between the protein affinity and methanogenic toxicity.

The data for the protein affinity (10) have been derived from values reported by Haslem, E, 1974, Polyphenolprotein interactions, Biochem. J. 139, pages 285–288. The values for methanogenic activity (0) were obtained on the basis of experiments performed by the Applicant. The activity is reported as the activity of the residual sludge which remains after exposure for 19 days to 2 g/l of gallic acid (n=1) or of gallotannic acid (n=9).

The test conditions were as follows: substrate: 4.2 g of volatile fatty acid COD/l sludge: 1.1 g of volatile suspended solids/l granular sludge. Activity of control: approximately 0.9 g COD/g of organic sludge material/day. Feeding: second substrate feeding on replaced medium after 19 days.

FIG. 2a: Model for reproducing the methanogenic toxicity of phenolic compounds as a function of the polymer size.

FIG. 2b: Methanogenic activity (0) with 1 g/l pyrogallol in the medium as a function of the autoxidation coloration.

FIG. 2c: Methanogenic activity (0) with 1 g/l gallotannic acid in the medium as a function of of the autoxidation coloration.

The autoxidation conditions were as follows: pH: 7.4 aeration time: 0–15 min.

The test conditions were as follows:
substrate: 4.2 g volatile fatty acid COD/l.
sludge: 1.1 g of volatile suspended particles/l; granular sludge.
activity of control: approximately 0.5 g of COD/g of organic sludge material/days.
feeding: first substrate feeding.

FIG. 3: Detoxification of 1.8 g of COD/l of pine wood bark removal waste water (*Pinus sylvestris*) by autoxidation. dation.

The methanogenic toxicity (0) tannin concentration (10) capable of absorption on polyvinylpyrrolidone (PVP) and UV absorption (X) are shown as a function of the polymerization induced by autoxidation. The degree of polymerization is indicated by the coloration determined as adsorption at 440 nm.

The autoxidation conditions were as follows:
Intial pH: 10.2, after which the pH drops to 9.6 after 45 min. The final pH was 8.2.
Aeration time: 0–48 hours (the points shown from left to right in the graph correspond to 0–0.75–3.25–23–48 hours).
Initial tannin concentration: 420 mg/l.
Tannin/total phenol ratio: 0.75.
The test conditions were as follows:
Substrate: 4.2 g of volatile fatty acids COD/l.
Sludge: 1.4 g of volatile suspended solids /l of granular sludge.
Activity of control: approximately 0.6 g COD/g of organic sludge material/day.
Feeding: second substrate feeding on replaced medium after 13 days exposure to waste water originating from wet bark removal.
Note: % toxicity=(1 −relative activity)×100, where the relative activity= treatment activity/-control activity.

I claim:

1. In a process for treatment of waste water containing phenolic compounds and degradable non-phenolic compounds, comprising anaerobic purification which generated methane, the improvement comprising, prior to said anaerobic purification, oxidatively polymerizing said phenolic compounds to water-soluble polyphenols having reduced methanogenic toxicity.

2. Process according to claim 1, characterized in that the oxidative polymerization is an autoxidation reaction performed by means of oxygen under neutral to basic conditions (autoxidation).

3. Process according to claim 1, characterized in that the oxidative polymerization is performed by means of oxygen and phenoloxidase enzymes.

4. Process according to claim 3, wherein the source of said phenoloxidase enzymes is bacteria, mold or vegetable material which contains or secretes said enzymes.

5. Process according to claim 1, characterized in that the oxidative polymerization is performed by means of oxygen, ozone or hydrogen peroxide and laccase enzymes.

6. Process according to claim 5, wherein the source of said laccase enzymes is bacteria, mold or vegetable material which contains or secretes said enzymes.

7. Process according to claim 1, characterized in that the oxidative pollymerization is performed by means of ozone or hydrogen peroxide with or without an inorganic catlyst.

8. Method according to claim 1, characterized in that the detoxification brought about by means of the oxidative polymerization is measured on the basis of the tannic acid content which can be absorbed on polyamide, protein or polyvinylpyrrolidone.

9. Method according to claim 1, characterized in that waste water containing phenolic compounds whose phenol groups are completely or almost completely substituted is subjected to an anaerobic polymerization prior to the oxidative pretreatment.

10. Process for detoxifying waste water which contains phenolic compounds which are toxic to aquatic organisms, comprising subjecting the waste water to an oxidative polymerization of said phenolic compounds, with substantially no precipitate being formed of polyphenol compounds produced and substantially no influence being exerted on the biochemical oxygen demand and the chemical oxygen demand of the waste water and subsequently anaerobically purifying said waste water.

11. Process according to claim 10, characterized in that the oxidative polymerization is an autoxidation reaction performed by means of oxygen under neutral to basic conditions.

12. Process according to claim 10, characterized in that the oxidative polymerization is perfrormed by means of oxygen and phenoloxidase enzymes.

13. Process to claim 12, wherein the source of said phenoloxidase enzymes is bacteria, mold or vegetable material which contains or secretes said enzymes.

14. Process according to claim 10, characterized in that the detoxification brought about by means of the oxidative polymerization is mesasured on the basis of the tannic acid content which can be absorbed on polyamide, protein or polyvinylpyrrolidone.

15. Process according to claim 10, characterized in that waste water containing phenolic compounds whose phenol groups are completely or almost completely substituted is subjected to an anaerobic pretreatment prior to the oxidative polymerization.

* * * * *